April 26, 1932.    B. G. LA BAR    1,855,746
METER STRUCTURE
Filed Aug. 19, 1930
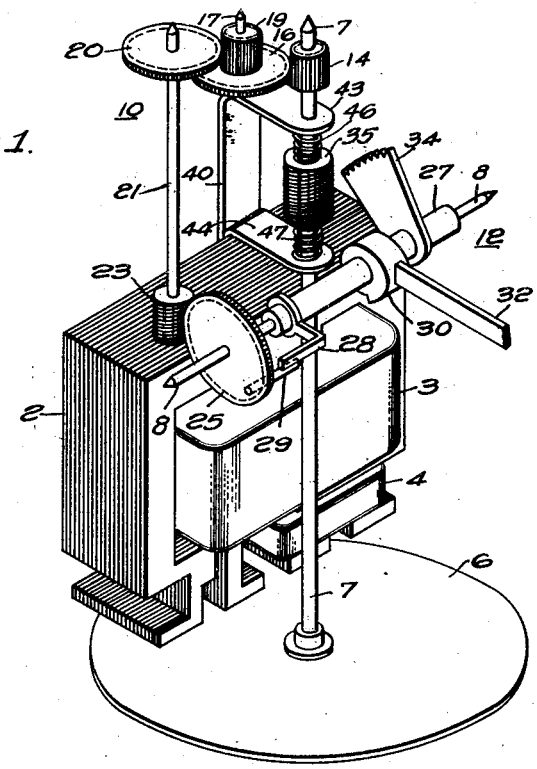
INVENTOR
Bert G. LaBar.
BY
ATTORNEY Patented Apr. 26, 1932

1,855,746

UNITED STATES PATENT OFFICE

BERT G. LA BAR, OF UNION, NEW JERSEY, ASSIGNOR TO WESTINGHOUSE ELECTRIC & MANUFACTURING COMPANY, A CORPORATION OF PENNSYLVANIA

METER STRUCTURE

Application filed August 19, 1930. Serial No. 476,370.

My invention relates to meter structures and particularly to pointer-resetting devices for meters of the demand type.

One object of my invention is to provide a device of the above-indicated character that shall be accurately operative at all times.

Another object of my invention is to compensate for minor and unavoidable inaccuracies between cooperating gear members and in the mountings thereof whereby the gears may be periodically disengaged and properly reengaged.

A further object of my invention is to provide a gear structure that shall be simple and durable in construction, economical to manufacture and effective in its operation.

In relation to cooperating gear members for alternate engagement and disengagement, as in a watt-hour demand meter employing intermittently engaging worm and screw gears, difficulty is experienced in having the gears properly engage. Particularly where the parts are small and delicate, as in a precision instrument, the minute gear teeth are readily thrown out of proper relation because of temperature changes, minor variations in the gear-supporting means, and other causes.

It is my aim to overcome these disadvantages and, accordingly, in practicing my invention, I provide for relative slip between the gears to ensure proper engagement thereof at all times and under all reasonable conditions; the slip preferably occurring in a direction different from the operative direction of movement of the gear. For example, in the case of a worm screw, where the operative movement is rotational, the slip movement is longitudinal or rectilinear.

Figure 1, of the accompanying drawings, is a perspective view of a portion of a watt-hour-demand-meter reset mechanism embodying my invention, and Fig. 2 is an enlarged detail view, partially in side elevation and partially in longitudinal section, of an element of the device shown in Fig. 1.

Referring to Fig. 1, the device comprises, in general, a motor-magnet core 2, windings 3 and 4 thereon, an armature disk 6 operatively associated with the core 2 and mounted for rotation on a primary armature shaft 7, a secondary shaft 8, a reduction-gear mechanism 10, between the shafts 7 and 8, and a reset mechanism 12.

All of the parts, above set forth, are for disposition in, and cooperation with, a demand meter (not shown) for resetting the demand pointer thereof, it being deemed unnecessary to illustrate the entire meter assembly for reasons which appear herein.

The core 2, the windings 3 and 4, the armature 6 and the shaft 7 constitute a motor in which the armature and shaft are driven at a constant speed. This motor and its parts are distinct from the similar-appearing meter motor and its parts which operate, in a well-known manner, in accordance with the quantity being measured to drive an integrating mechanism and a demand pointer which, in turn, moves a maximum pointer only in one direction to indicate the maximum demand during equal periods of time, such as fifteen minutes.

The demand pointer is adapted to be periodically released to move, or to be driven, back to zero position and it is the function of the device, including my invention, to effect such release.

The secondary shaft 8 is preferably disposed close to the primary shaft 7 at right angles thereto and is driven by the motor, at a slower speed than the shaft 7, through the gear-reduction means 10 which includes elements, such as a pinion 14 on the shaft 7, a gear wheel 16 on a shaft 17 and engaging the pinion 14, a pinion 19 on the shaft 17, a gear wheel 20 on a shaft 21 and engaging the pinion 19, a worm screw 23 on the shaft 21 and a worm wheel 25 on the shaft 8 and engaging the worm screw 23.

The resetting mechanism 12 comprises a sleeve 27 mounted on the shaft 8 to turn relative thereto but to remain in fixed longitudinal position thereon, a lever arm 28 fixed to the sleeve 27 in the path of movement of a pin 29 on the gear wheel 25, a cam 30 fixed to the sleeve 27 for periodically pushing a rod or reset element 32 in the longitudinal direction thereof, against the action of a spring (not shown), and a gear-wheel segment 34 fixed to the sleeve 27 for periodic engagement with a worm screw 35 on the primary shaft 7.

The worm screw 35 has heretofore been employed in the combination of elements above set forth but in fixed relation to the shaft 7. My invention, therefore, specifically relates to the details of this element, as indicated more clearly in Fig. 2, whereby it is longitudinally movable on its shaft and is biased toward a predetermined position.

The worm screw 35 is longitudinally-slidably fitted to the shaft 7 but has a longitudinally-extending internal groove 37 which closely fits the end 38 of a pin 39 that is tightly fitted in a radial opening in the shaft 7.

A bracket 40, which may preferably be of non-magnetic metal and mounted on the core 2, is provided with arms 43 and 44 which surround the shaft 7 above and below the worm screw 35, respectively, in spaced relation to the screw. Helical springs 46 and 47 surround the shaft 7, above and below the worm screw 35, respectively, between the latter and the stationary arms 43 and 44, respectively.

Normally, the springs 46 and 47 exert opposite forces to maintain the worm screw 35 in given position longitudinally on the shaft 7.

In operation, the screw 35 is rotated, at the speed of the armature 6, by means of the shaft 7 and the pin 38. The shaft 8 is driven through the gear-reduction means 10, so that the pin 29 on the gear wheel 25 completes one revolution in a given period of time, such as fifteen minutes.

During each revolution, in the counter-clockwise direction as viewed in Fig. 1, the pin 29 engages the lever arm 28 once and slowly advances it until the gear segment 34 engages the worm screw 35. Upon the occurrence of this engagement, the arm 28, the sleeve 27, the cam 30 and the gear segment 34 are advanced rapidly. This rapid advance causes the gear segment 34 to be thrown rapidly downwardly from the position illustrated in Fig. 1, to a position clear of the screw 35, to cause the cam 30 to give a quick impulse to the arm 32 and the arm 28 to advance to such position in advance of the pin 29 that it takes the latter fifteen minutes to again engage the arm 28. Upon the recurrence of each of such actions, the arm 32 releases the demand pointer to permit it to be returned by gravity, or to be driven, to its zero position where it is again connected to the meter mechanism for actuation in accordance with the demand of the quantity being measured during the next fifteen minutes.

As to the specific improvement provided by my invention, the gear teeth in the segment 34 and the worm on the screw 35 are usually very delicate and accurately formed, it being desirable, in any instrument of the type for which my invention is adapted, to have accuracy as a feature. However, in any instrument where alternately engaging and disengaging toothed gear members are employed, it is necessary for efficiency, and to prevent damage by stripping the gear teeth, to have the gears in accurately meshed relation.

Therefore, with the worm screw 35 mounted rigidly on the shaft 7, as in former practice, distortion of the parts, from any cause, or a slight misplacement during high-production assembly, is likely to result in improper engagement of the gear teeth, with the resultant stoppage, inaccurate operation, or damage to the instrument.

By the use of my invention, all of the former objections relating to this feature of the device, from the causes mentioned, are overcome and a simple, effective structure of ready assembly is provided and, although I have shown and described a particular form of the invention, various modifications may be effected therein without departing from the spirit and scope thereof, as set forth in the appended claims.

I claim as my invention:

1. In combination, a turnable shaft, a gear member mounted thereon to turn therewith and to move therealong, means for biasing said gear member in both directions toward a predetermined intermediate position along said shaft, and a cooperating segmental gear member mounted for alternate relatively-movable engagement with and entirely-separate disengagement from said first gear member.

2. In combination, a rotatable shaft, a worm screw mounted thereon to rotate therewith and to move longitudinally thereon, stop members disposed one in spaced relation to each end of the screw, springs disposed one between each end of the screw and the corresponding end stop member and exerting opposite forces on the screw, and a worm-gear segment mounted for alternate engagement with and entirely-separate disengagement from the screw.

3. In a meter structure, the combination with a motor, a member for resetting an element of the meter, and means operatively disposed between the motor and said member including members driven at different speeds by the motor, and cooperating gear members for alternate engagement and entirely-separate disengagement, one of said gear members being mounted on one of said driven members for positive rotation therewith and longitudinal movement thereon and another of said gear members being mounted on another of said driven members for turning movement relative thereto and fixed longitudinal position thereon.

4. In a demand-meter structure, the combination with a motor, a shaft driven thereby, a second shaft at right angles to said first shaft, reduction gears between the motor and the second shaft, a sleeve mounted on the second shaft in longitudinally fixed position thereon but turnable relative thereto, a cam on said sleeve, a reset element in the path of movement of the cam, a pin on one of said reduction gears, a lever arm fixed to the sleeve in the path of movement of said pin, and a gear segment fixed to the sleeve, of a worm screw longitudinally slidably mounted on said first shaft, but fixed for turning movement therewith, a pair of stationary arms surrounding said first shaft in longitudinally spaced relation to the opposite ends of said worm screw, a pair of helical springs around said first shaft disposed one between one end of said worm screw and one of said arms and the other between the other end of the worm screw and the other arm, said springs exerting opposite pressure from said arms against the worm screw and said gear segment being positioned for alternate engagement with said worm screw and entire separation therefrom.

In testimony whereof, I have hereunto subscribed my name this 15th day of Aug., 1930.

BERT G. LA BAR.